(12) United States Patent
Zhang et al.

(10) Patent No.: US 9,876,397 B2
(45) Date of Patent: Jan. 23, 2018

(54) ELECTRICAL MACHINE

(71) Applicant: Brose Fahrzeugteile GmbH & Co. KG, Wuerzburg, Wuersburg (DE)

(72) Inventors: Sunny Zhang, Wuerzburg (DE); Matthias Koch, Waldbuettelbrunn (DE); Axel Steinshorn, Wittighausen (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 530 days.

(21) Appl. No.: 14/485,184

(22) Filed: Sep. 12, 2014

(65) Prior Publication Data

US 2015/0001977 A1 Jan. 1, 2015

Related U.S. Application Data

(63) Continuation of application No. PCT/EP2012/004462, filed on Oct. 25, 2012.

(30) Foreign Application Priority Data

Mar. 13, 2012 (DE) .................. 10 2012 005 141

(51) Int. Cl.
*H02K 21/12* (2006.01)
*H02K 1/02* (2006.01)
(Continued)

(52) U.S. Cl.
CPC ................ *H02K 1/02* (2013.01); *H02K 1/06* (2013.01); *H02K 1/17* (2013.01); *H02K 1/27* (2013.01);
(Continued)

(58) Field of Classification Search
CPC ........ Y10T 29/49009; Y10T 29/49012; H02K 1/2766; H02K 1/278; H02K 1/02; H02K 1/276
(Continued)

(56) References Cited

U.S. PATENT DOCUMENTS 5,962,944 A 10/1999 Narita et al.
6,047,460 A * 4/2000 Nagate .................. H02K 1/276
205/137

(Continued)

FOREIGN PATENT DOCUMENTS

CN 1215942 A 5/1999
CN 1375122 A 10/2002
(Continued)

OTHER PUBLICATIONS

Chinese Office Action for Chinese Application No. 201280071454.7 dated Dec. 30, 2016—English translation.
(Continued)

*Primary Examiner* — Thanh Lam
(74) *Attorney, Agent, or Firm* — Muncy, Geissler, Olds & Lowe, P.C.

(57) ABSTRACT

An electrical machine, in particular an electric motor of a motor vehicle, having a stator and having a rotor which has a rotation axis. An electrical machine can be a brushless electric motor (DC motor) or a synchronous machine, but also a generator. The stator or the rotor has an electromagnet structure, and the other has a permanent-magnet structure which comprises a first quantity of permanent magnets and a second quantity of permanent magnets. At at least the operating temperature (T), the magnetic coercive field strength (Hcji) of the first quantity is greater than the
(Continued)

magnetic coercive field strength (Hcj2) of the second quantity. Further, two methods for producing hybrid magnets are provided.

3 Claims, 4 Drawing Sheets

(51) Int. Cl.
  *H02K 21/16* (2006.01)
  *H02K 1/27* (2006.01)
  *H02K 1/06* (2006.01)
  *H02K 1/17* (2006.01)
  *H02K 3/46* (2006.01)

(52) U.S. Cl.
  CPC ........... *H02K 1/276* (2013.01); *H02K 1/2766* (2013.01); *H02K 1/2773* (2013.01); *H02K 3/46* (2013.01); *H02K 21/16* (2013.01); *H02K 2201/03* (2013.01); *H02K 2213/03* (2013.01)

(58) Field of Classification Search
  USPC .................................................... 29/596, 598
  See application file for complete search history.

(56) References Cited

U.S. PATENT DOCUMENTS

| | | | |
|---|---|---|---|
| 6,847,143 | B1 | 1/2005 | Akemakou |
| 7,556,082 | B2 | 7/2009 | Welchko et al. |
| 8,269,390 | B2 | 9/2012 | Sakai et al. |
| 8,269,392 | B2 | 9/2012 | Doi et al. |
| 2005/0040721 | A1 | 2/2005 | Kusase et al. |
| 2007/0284960 | A1 | 12/2007 | Fulton et al. |
| 2008/0231132 | A1 | 9/2008 | Minowa et al. |
| 2010/0072850 | A1 | 3/2010 | Miyata et al. |
| 2010/0244608 | A1* | 9/2010 | Nakamura ................ H01F 1/08 310/156.38 |
| 2010/0277017 | A1 | 11/2010 | Alexander et al. |
| 2010/0327787 | A1* | 12/2010 | Sakai .................... H02K 1/276 318/400.09 |
| 2011/0315913 | A1 | 12/2011 | Shigeoka et al. |
| 2013/0127280 | A1 | 5/2013 | Sugimoto et al. |

FOREIGN PATENT DOCUMENTS

| | | |
|---|---|---|
| CN | 101047325 A | 10/2007 |
| CN | 101232205 A | 7/2008 |
| CN | 101485064 A | 7/2009 |
| CN | 101946386 A | 1/2011 |
| CN | 102044944 A | 5/2011 |
| CN | 102300655 A | 12/2011 |
| DE | 10 2007 015 839 A1 | 10/2008 |
| DE | 10 2009 000 028 A1 | 7/2010 |
| EP | 1 223 658 A1 | 7/2002 |
| EP | 2 246 961 A1 | 11/2010 |
| EP | 2 360 814 A1 | 8/2011 |
| JP | S 59-61008 A | 4/1984 |
| JP | S 60-219947 A | 11/1985 |
| JP | S 60-226749 A | 11/1985 |
| JP | 2003-017309 A | 12/1996 |
| JP | H 08-340651 A | 12/1996 |
| JP | H 10-304610 A | 11/1998 |
| JP | 2002-540754 A | 11/2002 |
| JP | 2006-115663 A | 4/2006 |
| JP | 2006115663 A * | 4/2006 |
| JP | 2007-208104 A | 8/2007 |
| JP | 2007208104 A * | 8/2007 |
| JP | 2009-027846 A | 4/2010 |
| JP | 2010-098863 A | 4/2010 |
| JP | 2010-130859 A | 6/2010 |
| JP | 2011-078270 A | 4/2011 |
| JP | 5398103 B2 | 1/2014 |
| WO | WO 01/22560 A1 | 3/2001 |
| WO | WO 2006/109615 A1 | 10/2006 |
| WO | WO 2007/146208 A1 | 12/2007 |
| WO | WO 2011/125209 A1 | 10/2011 |
| WO | WO 2012/014260 A1 | 2/2012 |

OTHER PUBLICATIONS

Japanese Office Action for Japanese Application No. 2014-561291 dated Aug. 30, 2016 with partial English translation.
Japanese Office Action for Japanese Application No. 2014-561290 dated Jul. 5, 2016—English translation.
Japanese Office Action for Japanese Application No. 2014-561291 dated Mar. 13, 2017 with partial English translation.
Japanese Office Action for Japanese Application No. 2014-561290 dated Mar. 17, 2017 with partial English translation.
Chinese Office Action for Chinese Application No. 201280071454.7 dated Apr. 29, 2016—English translation.
Chinese Office Action for Chinese Application No. 201380014358.3 dated Apr. 26, 2016—English translation.
Chinese Office Action for Chinese Application No. 201380014379.5 dated Sep. 28, 2016—English translation.

* cited by examiner

ELECTRICAL MACHINE

This nonprovisional application is a continuation of International Application No. PCT/EP2012/004462, which was filed on Oct. 25, 2012, and which claims priority to German Patent Application No. DE 10 2012 005 141.7, which was filed in Germany on Mar. 13, 2012, and which are both herein incorporated by reference.

BACKGROUND OF THE INVENTION

Field of the Invention

The present invention relates to an electrical machine having a stator and having a rotor with an axis of rotation. An electrical machine can be, for example, a brushless electric motor (DC motor) or a synchronous machine, but a generator as well.

Description of the Background Art

In the automotive industry or in motor vehicles, electric motors (DC motors) are used in drives for various actuating elements, for example, as window lift, sunroof, or seat adjustment drives and/or as a steering wheel drive (electric power steering), as a cooling fan drive, or as a transmission actuator. Such electric motors have a relatively high torque or power density and should be reliable to operate particularly also at relatively high engine temperatures of, for example, up to at least 120° C.

In principle, brushed electric motors (commutator motors) and/or brushless electric motors, whose rotor, surrounded by a stator provided with a field winding, is equipped or provided with permanent magnets, are used in the automotive sector. Typically, both the rotor and stator are made as lamination stacks, whereby stator teeth with stator slots lying inbetween support the coils of the field winding. These are controlled by an (electronic) circuit in order to generate a rotating field which produces a torque on the permanently excited rotor.

Because both high operating temperatures and (external) magnetic fields, which are caused, for example, by current peaks induced in the stator-side field winding or coil, can lead to an undesirable end magnetization of the rotor-side permanent magnet, magnet materials or alloys with as high a coercive field strength as possible are usually used. To achieve as high a coercive field strength as possible, therefore, as a rule alloys with components or amounts of rare earth elements are used. In this regard, both light rare earth elements (LREE), particularly samarium-cobalt or neodymium-iron-boron alloys, as well as terbium- or dysprosium-containing alloys are employed to increase the coercivity and to broaden the usable temperature range. In the meantime, however, the so-called heavy rare earth elements (HREE) such as, for example, terbium and particularly dysprosium, have become increasingly cost-intensive.

SUMMARY OF THE INVENTION

It is therefore an object of the present invention to provide an especially suitable electrical machine, which can be produced especially at a relatively low price and advantageously has a relatively high demagnetization resistance.

The electrical machine is in particular an electric motor, preferably a brushed DC motor, and comprises a stator and a rotor. The rotor is mounted rotatably around an axis of rotation with respect to the stator, whereby the rotor is disposed, for example, within the stator. Alternatively, the rotor surrounds the stator in the manner of an external rotor. The stator and rotor are suitably disposed within a housing, which protects both of these from possible damage and/or environmental effects.

Either the stator or the rotor has an electromagnet structure with at least one coil body, which is mounted in a specific position to the other of the two parts, therefore the rotor or stator. The coil body has an enameled copper wire and is used to generate a time-varying magnetic field, if the electrical machine is an electric motor. This is provided by energization of the coil via the terminal ends. During use as a generator, an induced electrical voltage is tapped off at the coil body.

The stator or rotor that is free of the electromagnet structure comprises a permanent magnet structure. In other words, either the stator or rotor has the electromagnet structure and the other the permanent magnet structure. Especially preferably, the electromagnet structure is part of the stator and the permanent magnet structure is part of the rotor.

The permanent magnet structure has a first set and a second set of permanent magnets, whereby the permanent magnets of the particular set are positioned at specific locations. Each set comprises at least one permanent magnet, the permanent magnets of the particular set being formed the same, for example. Preferably, the number of permanent magnets in the two sets corresponds to one another and is particularly the same, or, for example, the one number is an integer multiple of the other number.

The magnetic coercive field strength of the first set of permanent magnets is greater than the magnetic coercive field strength of the second set. In other words, the magnetic coercive field strength of each permanent magnet of the first set is greater than the magnetic coercive field strength of each permanent magnet of the second set, whereby preferably the magnetic coercive field strength of all permanent magnets in each set is the same. This property applies at least at the operating temperature of the electrical machine, whereby the operating temperature adjusts in particular after a specific operating time.

For example, the operating temperature is determined within the region of the permanent magnet structure, preferably for each permanent magnet of the permanent magnet structure. The maximum operating temperature in this case is between 80° C. and 120° C. For example, at temperatures below the operating temperature as well, the magnetic coercive field strength of the first set is greater than the magnetic coercive field strength of the second set.

Preferably, the permanent magnets of the first set are arranged at exposed locations where the occurrence of demagnetization is relatively pronounced due to relatively high operating temperatures, an (external) magnetic field or flux undesirable per se or to be avoided, or during the operation of the electromagnet structure. Because of the positioning of the permanent magnets of the first set, which are relatively resistant to this, a sufficient demagnetization resistance of the permanent magnet structure is assured. As a result, it is made possible to produce the permanent magnets of the second set from a relatively low-priced material, because these are not subjected to demagnetization to the same extent as the permanent magnets of the first set.

Suitably, all permanent magnets of the particular set are produced from the same material and preferably have the same structure. In particular, all magnets of one of the sets are identical. For example, all permanent magnets of the particular set are produced in the same work step or cut from a block magnet, different blocks being used for the two sets. Alternatively, all permanent magnets of the permanent magnet structure are produced from the same material but in a different way, so that there is a difference in the coercive field strength.

Suitably, at at least the operating temperature the remanence of the second set is greater than the remanence of the first set. Consequently, the magnetic field generated per volume by the permanent magnets of the second set is stronger than that of the permanent magnets of the first set. Thus, it is made possible to realize a relatively strong magnetic field of the permanent magnet structure by means of the permanent magnets of the second set, whereby a possible demagnetization of the permanent magnet structure by the permanent magnets of the first set is prevented. In this way, the permanent magnets of both sets can be optimized for their specific intended use, whereby the particular other feature, therefore the magnetic coercive field strength or the remanence, is considered to a lesser extent. The permanent magnets of the permanent magnet structure thus need not fulfill both requirements, resulting in a saving of cost, whereby the electrical machine nevertheless meets a relatively high performance requirement.

Expediently, one permanent magnet of the first set and one permanent magnet of the second set are combined to form a hybrid magnet, which is arranged tangentially with respect to the axis of rotation. The permanent magnets, assigned to one another, of the first set and the second set thus lie particularly at least partially on a tangential straight line. Here, the permanent magnet of the first set forms, at least on one side, the termination of the hybrid magnet in the tangential direction. In other words, both permanent magnets of the hybrid magnets are arranged along the tangential straight line. In this regard, the element with the greatest distance to a straight line, running radially to the tangential straight line and passing through the axis of rotation, is the permanent magnet of the first set. In this way, the permanent magnet of the second set is sufficiently protected from demagnetization by the electromagnet structure, which occurs predominantly at the free ends of a tangentially arranged permanent magnet.

Advantageously, all magnetic poles of the permanent magnet structure are formed by the hybrid magnets, whose number is preferably between 8 and 10. When the electrical machine is used as an electric motor, a relatively constant torque band is therefore assured and when it is used as a generator a relatively constant current flow is assured.

Especially preferably, the or each hybrid magnet comprises two permanent magnets of the first set, between which the permanent magnet of the second set is arranged in the tangential direction. For example, the permanent magnet of the second set is cuboid, and the likewise cuboid permanent magnets of the first set are arranged at its ends in the tangential direction. For example, the three permanent magnets of the or each hybrid magnet are separated by crosspieces running perpendicular to it, which are produced preferably from a soft-magnetic material, such as laminations.

Alternatively, the permanent magnet of the first set has a recess which runs parallel to the axis of rotation and within which the permanent magnets of the second set are located. In this case, the permanent magnet of the second set is thus surrounded particularly in the tangential and radial direction by the permanent magnet of the first set. In particular, the permanent magnet of the first set is produced in the desired shape by plastic injection molding. Alternatively, after the molding of the permanent magnet of the first set, the recess is introduced into it.

Because of such an arrangement, during operation the second set is protected relatively effectively from demagnetization by the electromagnet structure, because this would occur most especially in the edge region of the hybrid magnet. There, however, the permanent magnet(s) of the first set, which are relatively resistant to this, are positioned relatively closely to the electromagnet structure. Preferably, a magnetic field generated by the permanent magnet of the second set is directed by means of the magnet(s) of the first set.

Expediently, the magnetization direction of all permanent magnets of the or each hybrid magnet is parallel to one another. In other words, the magnetization directions of all permanent magnets, which together form one of the hybrid magnets in each case or are at least a component thereof, are oriented in the same direction. Consequently, a magnetic field that promotes the demagnetization of the permanent magnet of the second set is not produced by the permanent magnet of the first set. Further, a demagnetization of the permanent magnet of the first set by the magnetic field of the permanent magnet of the second set is prevented or at least weakened. Moreover, when the electrical machine is turned off and thus when the electromagnet structure is not energized, the permanent magnet of the first set is again magnetized in its original magnetization direction by the permanent magnet of the second set, for which reason the lifetime of the electrical machine is increased.

This effect is intensified by direct mechanical contact of the individual permanent magnets of the or each hybrid magnet. Moreover, with this type of arrangement of both permanent magnets, the installation space is reduced regardless of the magnetization direction, and it is made possible to produce the or each hybrid magnet even before mounting on the rotor or stator. For example, the or each hybrid magnet is constructed as a matrix from plastic-based, long-lasting or permanent magnets. In particular, the two permanent magnets are glued together for this purpose. In a parallel magnetization of the two permanent magnets, this can be omitted because these are connected together due to the mutually acting magnetic force.

Expediently, the or each hybrid magnet is arranged in a pocket of a lamination stack. The course of the pocket in this case is preferably substantially parallel to the axis of rotation, and the laminations have a soft-magnetic material. Because of the use of individual laminations that are insulated from one another, for example, by means of an enamel layer, propagation of parasitic induction currents is suppressed, which would otherwise reduce the efficiency of the electrical machine. Further, the permanent magnets are protected from damage and/or environmental effects, which otherwise would lead to corrosion, for example. The assembly of the hybrid magnet is also facilitated, because it or its components only need to be inserted in the pocket of the lamination stack. In particular, in the case of mounting on a rotor, loosening of the hybrid magnet due to centrifugal forces during the operation of the electrical machine is prevented.

Expediently, the material of the first set is a ferrite, which is preferably sintered. Alternatively, the material is, for example, sintered SmCo or NdFeB, (NdDy)FeB. It is also possible to cast the material, whereby preferably NdFeB, SmCo, or SmFeN is used. For example, the same materials as the material of the second set are used, whereby the type of composition and/or production is tailored to achieving the increased magnetic coercive field strength of the first set.

For example, the material is the same for the first and the second set, which prevents contact corrosion in a direct mechanical contact of the particular permanent magnets. Suitably, an alloy, which has light rare earth elements, is used as the material of the second set. These are distinguished particularly by a relatively high remanence, for which reason the performance of the electrical machine is increased. The associated low magnetic coercive field strength, in comparison with the use of heavy rare earth elements, is compensated by the use of the first set. Especially preferably, the second set has NdFeB, which has a relatively great availability and high remanence.

In particular, the permanent magnet structure and suitably the entire electrical machine are free of heavy rare earth elements. At least, it has no dysposium and/or terbium. It is made possible in this way to produce the electrical machine relatively cost-effectively.

A further object of the invention is the provision of an especially suitable method for producing a hybrid magnet, which is relatively time-saving.

Said object is attained according to the invention by the features of claim 8 and alternatively by the features of claim 14. Advantageous refinements and embodiments are the subject of the particular dependent claims.

The method provides that in a first work step a core is created from a second set, said core having a second magnetic coercive field strength. In this case, the core is formed, for example, by injection molding or injection compression molding, and particularly the state of the second set is transformed from a liquid to a solid form. It is also conceivable that the second set present in a granular structure is transformed into a homogeneous or nonhomogeneous body by heating and/or exerting pressure on the second set, therefore, for example, by sintering. The shape of the core is, for example, cylindrical, whereby a rectangle is used advantageously as the base area. In other words, the core is substantially cuboid. Preferably, the core is magnetized during its creation, for example, by application of an external magnetic field.

In a further work step, the core is placed in a press mold and positioned suitably therein. For this purpose, in particular the volume of the press mold is greater than that of the core. For example, the press mold is also formed cuboid but at least cylindrical. For example, the core after the positioning is located in an edge region of the press mold and lies against a wall of the press mold. Alternatively, the core is located at a distance from all walls of the press mold. In a work step that follows indirectly or directly, the press mold is filled with a first set, which has a first coercive field strength. This is greater than the magnetic coercive field strength of the second set at least at an operating temperature of the hybrid magnet within the electrical machine. For example, before filling in the press mold, the first set is transformed to a liquid state, e.g., by heating. Advantageously, the first set hardens in the press mold. In other words, the first set and suitably the entire hybrid magnet is substantially dimensionally stable after its completion. The production of the hybrid magnet is relatively simple in this regard, whereby different geometries of the hybrid magnet can be realized by suitable selection of the press mold and/or shaping of the core.

Suitably, the first set is sintered in the press mold. For this purpose, during filling of the press mold the first set has, for example, a granular or dust-like structure, which is transformed in the press mold into a substantially solid object by application of a force. A dimensionally stable hybrid magnet is created with this type of work step, on the one hand, whereby a mechanical or thermal load both on the press mold and the core already placed therein is minimized, because during sintering the exerted force or the employed temperature remains below the recrystallization temperature or pressure of the first set. It is assured in this way that a possible magnetization of the core is retained during the solidification of the first set.

Expediently, an external magnetic field is applied during the filling of the press mold by the first set. When using the magnetic field, even during the filling of the press mold, the first set is oriented according to the later desired magnetic field. Alternatively or in combination, the magnetic field is applied during the sintering, provided that the first set is compressed within the press mold. It is made possible in this way to position the hybrid magnet even immediately after removal of the press mold in the electrical machine, without magnetization of the hybrid magnet having to be performed first. Further, the remanence of the hybrid magnet and its magnetic coercive field strength are increased in such a production method; this improves the lifetime and performance of the electrical machine.

In particular the applied external magnetic field is parallel to the magnetic field of the core, provided it has already been magnetized. The first set is magnetized substantially parallel to the second set in this way and the created hybrid magnet has a linear magnetization. Thus, the remanence and the magnetic coercive field strength of the hybrid magnet are increased further and the second set is protected from demagnetization during operation of the electrical machine. Further, the production is simplified, because the core need not be safeguarded against an independent orientation in the applied magnetic field.

Alternatively, both the core and the first set are not magnetized after the filling. In such a case, after these are removed from the press mold or while they are in the press mold, the hybrid magnet is magnetized by application of an external magnetic field.

In a suitable embodiment of the invention, a pocket within a lamination stack of the electrical machine is used as the press mold. The lamination stack is hereby part of either the rotor or stator of the electrical machine. After the molding of the hybrid magnet within the pocket has been completed, the magnet remains there. In this way, on the one hand, there is a relatively strong connection of the hybrid magnet to the lamination stack. On the other hand, the assembly of the electrical machine is simplified, because the hybrid magnet does not need to be produced first and then mounted on the electrical machine. Rather, the hybrid magnet is formed within it.

Expediently, the press mold is filled with part of the first set before insertion of the core into it. Suitably, the pocket is provided with a base, which is therefore covered by the first set before insertion of the core. Thereby the core is not only surrounded by the first set perpendicular to its insertion direction, but also in the insertion direction. For example, during filling the core is covered by the first set, so that it is covered by the first set in the insertion direction on both sides. Especially preferably, a space is provided here between the core and all walls of the press mold, whereby this space is filled by the first set.

An alternative method for producing a hybrid magnet provides that, on the one hand, a block of a first set and, on the other, a core of a second set are created. In other words, both the first set and the second set are made dimensionally stable, which occurs by casting or sintering, for example. In particular, the block and/or the core are produced by injection molding technology. It is also conceivable to produce both or at least one of these by injection compression molding technology. For example, in the creation of both, which occurs expediently independently of one another, an external magnetic field is applied in order to magnetize the particular set in a preferred direction. In this regard, the magnetic coercive field strength of the first set is greater than that of the second set. The shape of both the core and the block is preferably cylindrical, whereby a rectangle or a trapezoid can be used suitably as the cross section. To this end, advantageously possible shapes for creating the particular element are formed accordingly.

In a work step following the creation of the core and the block, the two are connected together. In this case, preferably the magnetization direction of the block and the core is parallel to one another. In particular, the block is arranged perpendicular to the magnetization direction of the core and/or lies form-fittingly or flush against it. For this purpose, preferably the contact surface runs substantially parallel to the magnetization direction. Alternatively or in combination, the contact surface is parallel to the extension direction of both the core and the block. In another embodiment, the core is inserted in a recess, for example, a hole or a slot, of the block. In this type of production of the hybrid magnet, this allows for the production of the block and the core independently from one another. In particular, if the first and second set is formed of different materials, the block and the core can be produced with different machines and at different locations.

If the composite of the core and the block does not have a pronounced magnetization, it is exposed to an external magnetic field after connection and thereby a preferred direction of the magnetization of the composite is created. Magnetization after the connection assures that the magnetization direction of the core and of the block is parallel to one another. Further, for the connection of the two no magnetic forces exerted mutually or on possible devices need to be compensated, which would change an orientation of the block to the core.

For example, the block and the core are pressed together. In other words, a force is exerted on the block and the core perpendicular to their mutual contact surface and the two elements are connected by means of the force. Alternatively or in combination, an adhesive is used for this purpose which is applied to the contact surface before the joining. In this way, a relatively cost-effective and lasting connection between the core and the block is realized.

Expediently, the extension length of the block and the core is substantially the same and, for example, longer than the desired length of the hybrid magnet. Advantageously, the extension length is an integer multiple of the desired length of the hybrid magnet. After connection of the block with the core, this composite is trimmed to the desired length of the hybrid magnet, for example, cut. In the case of an extension length of an integer multiple of the length of the desired hybrid magnet, waste is eliminated. Advantageously, a relatively small compensation length is provided to take into account possible waste. Because the core and the block are formed with an excess length, this allows to produce a relatively large number of hybrid magnets with the execution of the method with only one block and one core, which lowers production costs.

Suitably, two blocks are created from the first set and connected to the core. In so doing, the core is suitably positioned between the two blocks and connected in this arrangement to both blocks. In this way, a hybrid magnet resistant to demagnetization is produced relatively simply and cost-effectively. For example, the two blocks are produced by trimming of a mother block, which is made from the first set and which has double the length of each of the blocks.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
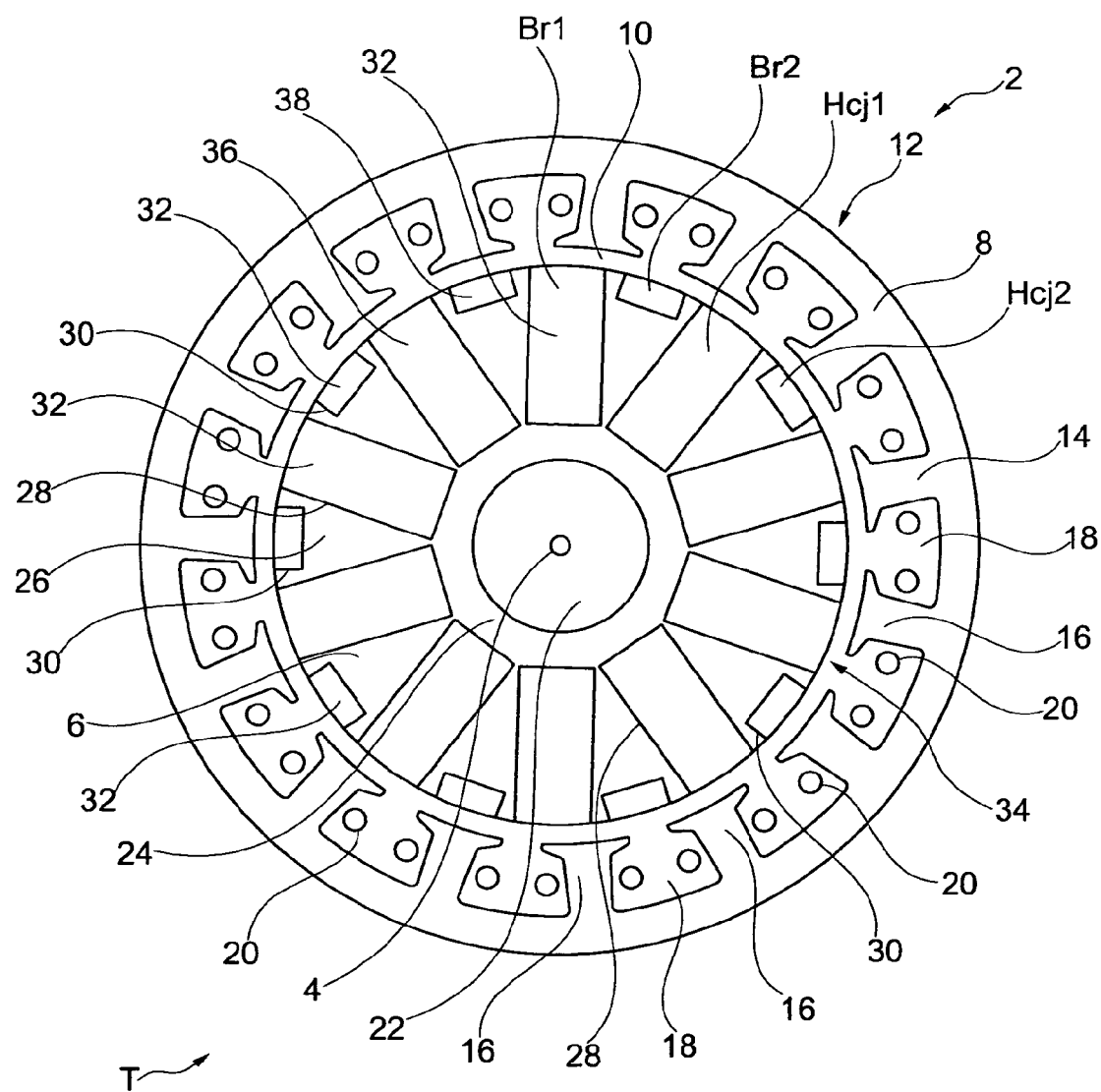
FIG. 1 shows in a sectional illustration an electrical machine with a first and a second set of permanent magnets.

A first embodiment of an electrical machine 2, designed as a synchronous machine and used as an electric motor, is shown in FIG. 1. Electrical machine 2 is shown here in a sectional illustration perpendicular to an axis of rotation 4 of a rotor 6, which is surrounded by a stator 8, an air gap 10 being formed between these. Stator 8 comprises an electromagnet structure 12 with a soft-magnetic stator lamination stack 14, which has 15 teeth 16, each of which is separated by a slot 18 running parallel to axis of rotation 4. A coil 20, which is disposed in two adjacent slots 18, is looped around each tooth 16. Coils 20 are fabricated of an enameled wire and are energized by means of electronics (not shown). Electric motor 2 therefore is brushless.

Rotor 6 has a shaft 22, which is enclosed by a substantially nonmagnetic core 24 with a regular decagon as a cross section. Core 24 is surrounded form-fittingly by a soft-magnetic lamination stack 26, which as a result has a relatively low magnetic coercive field strength. Ten first pockets 28 of equal size and 10 second pockets 30 of equal size, which extend parallel to axis of rotation 4, are made in the lamination stack, whereby the volume of second pocket 30 constitutes a tenth of first pocket 28. A permanent magnet 32 of a permanent magnet structure 34 is disposed form-fittingly within pockets 28, 30, permanent magnets 32 being divided into a first set 36 and a second set 38. First set 36 is thereby assigned to first pockets 28 and second set 38 to second pockets 30. Permanent magnets 32 of first set 36 are made of a sintered ferrite and have a first magnetic coercive field strength $Hcj_1$ and a first remanence $Br_1$, which are the same for all permanent magnets 32 of first set 36.

Permanent magnets 32, having NdFeB, of second set 38 have a constant second magnetic coercive field strength $Hcj_2$ and a constant second remanence $Br_2$. In this case, permanent magnets 32 of second set 38 are made in such a way that second remanence $Br_2$ is maximal. This causes a relatively low second magnetic coercive field strength $Hcj_2$. The situation is the opposite in permanent magnets 32 of first set 36, so that the first magnetic coercive field strength $Hcj_1$ is relatively high. At least at an operating temperature T of electrical machine 2, which is between 40° C. and 80° C., but can also be up to 120° C. or even 140° C., the first magnetic coercive field strength $Hcj_1$ is greater than the second magnetic coercive field strength $Hcj_2$ and the second remanence $Br_2$ is greater than the first remanence $Br_1$.

The magnetization direction of permanent magnets 32 of first set 36 is tangential, whereby permanent magnets 32 are arranged within first pockets 28 such that in each case the magnetic north and south poles of adjacent permanent magnets 32 are directed to one another. Permanent magnets 32 of second set 38, in contrast, are arranged and magnetized such that their particular north or south pole is directed to the respective opposite pole of permanent magnets 32 of first set 36. As a result, the south pole of one of permanent magnets 32 of second set 38, said south pole being arranged between two north poles of two permanent magnets 32 of first set 36, is directed to axis of rotation 4, whereas the north pole points in the direction of stator 8.

Figure 2:
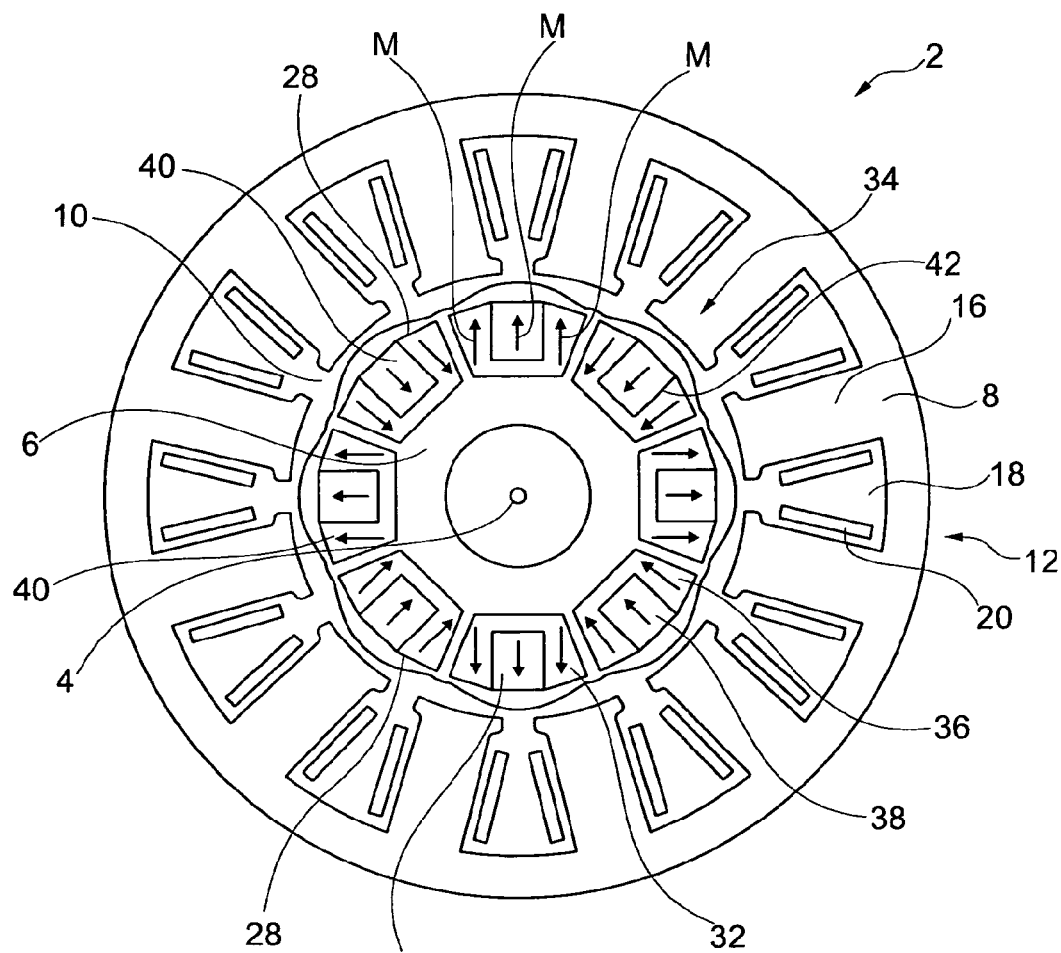
FIG. 2 shows a further embodiment of the electrical machine with hybrid magnets according to FIG. 1.

A further embodiment of electrical machine 2, likewise in a sectional illustration perpendicular to axis of rotation 4, is shown in FIG. 2. Here also, stator 8 has electromagnet structure 12, which however comprises only 12 teeth 16 as well as 12 slots 18 and 12 coils 20. Rotor 6 has eight magnetic poles, which are formed by a corresponding number of hybrid magnets 40, which are again disposed in first pockets 28 of lamination stack 26. Each hybrid magnet 40 has both one of permanent magnets 32 of first set 36 and one of permanent magnets 32 of second set 38, whose magnetization direction M runs parallel to one another and substantially radially. In this case, the cross section of each hybrid magnet 40 is substantially that of a honeycomb compressed on one side in the radial direction, whereby the axis of symmetry runs radially. Permanent magnet 32 of second set 38 in contrast has a square cross section and is inserted form-fittingly in a slot 42 of permanent magnet 32 of first set 36 and pressed in there. Consequently, both permanent magnets 32 of each hybrid magnet 42 are in direct mechanical contact, whereby permanent magnet 32 of second set 38 is surrounded by permanent magnet 32 of first set 36 in the tangential direction, where primarily the magnetic field produced by electromagnet structure 12 interacts with hybrid magnet 40.

Each of first pockets 28 introduced in lamination stack 26 is shaped according to the particular hybrid magnet 40, which lies within it form-fittingly. Lamination stack 26 is furthermore exposed on the side, opposite to axis of rotation 4, of hybrid magnets 40 to form the magnetic field in the radial direction, so that the size of air gap 10 formed between the rotor and stator is not constant.

Figure 3A:
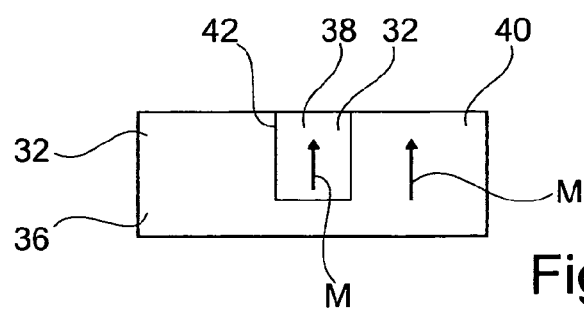
FIGS. 3a, b show alternative embodiments of the hybrid magnet.
Figure 3B:
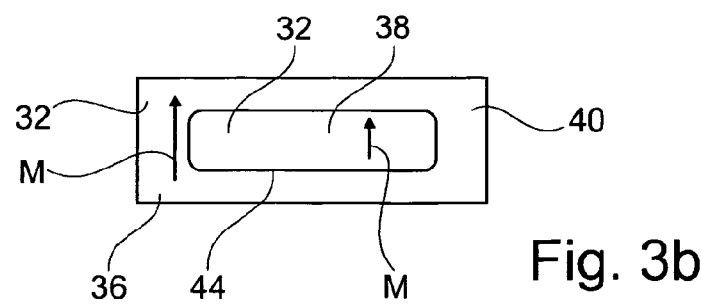

Two further embodiments of hybrid magnet 40 in a sectional illustration perpendicular to axis of rotation 4 are shown in FIGS. 3a and 3b. In this case, the cross section of permanent magnet 32 of first set 36 is substantially rectangular, so that permanent magnet 32 has a substantially cuboid form. In FIG. 3a, in keeping with the embodiment shown in FIG. 2, slot 42, which runs parallel to axis of rotation 4 and in which permanent magnet 32 of second set 38 is inserted flush, is introduced in permanent magnets 32 of first set 36. The embodiment of permanent magnet 32 of second set 38 itself corresponds substantially to that shown in FIG. 2. Said embodiment of hybrid magnet 40 is relatively simple to produce and to store in comparison with the previous one.

A recess 44, which is shaped like an oblong hole and within which permanent magnet 32 of second set 38 is positioned form-fittingly, is introduced centrally in permanent magnets 32 of first set 36, which are also shown in a sectional illustration to axis of rotation 4 in FIG. 3b. In other words, permanent magnet 32 of second set 38 is surrounded both radially and tangentially by permanent magnet 32 of first set 36. In the direction of axis of rotation 4, depending on the embodiment, permanent magnet 32 of second set 38 is either also surrounded by permanent magnet 32 of the first set or lies freely. In particular if permanent magnet 32 of second set 38 has a tendency to oxidize, said magnet is covered by permanent magnet 32 of first set 36. In the two embodiments shown in FIGS. 3a and 3b of hybrid magnet 40, the magnetization direction M of the two permanent magnets 32 is parallel to one another. Further, first pockets 28 of rotor 6 are formed such that the magnetization direction M runs radially. In this case, hybrid magnets 40 are arranged in a way similar to that shown in FIG. 2. In other words, the polarities of hybrid magnets 40 changes in the circumferential directions.

Figure 4:
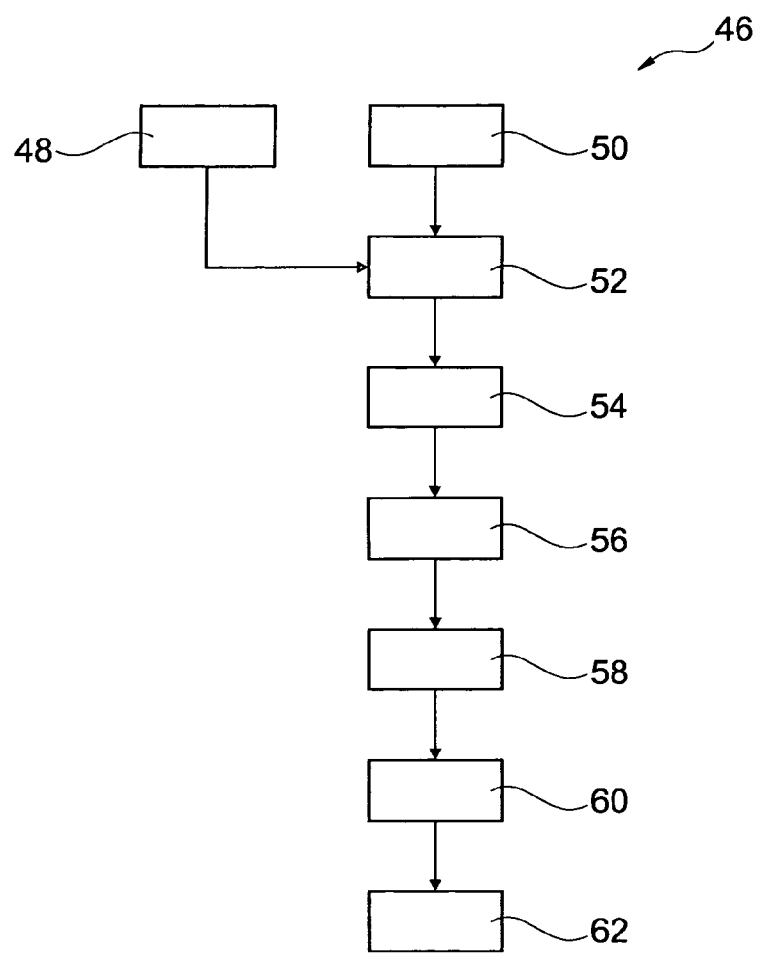
FIG. 4 shows schematically a method for preparing the hybrid magnets.

In FIG. 4, a first method 46 for producing hybrid magnets 40, shown in FIG. 2, FIG. 3a, and FIG. 3b, is shown schematically in a flowchart. In a creation step 48, first a number of cores of second set 38 is created, a number which corresponds to the number of hybrid magnets 40, and thus permanent magnets 32 of second set 38 are formed. To this end, NdFeB is pressed into one or more moldings in the substantially cuboid form. In so doing, the material is heated and during the molding process an outer magnetic field is applied to the material to give its magnetization M a preferred direction.

In a filling step 50, first pockets 28 of rotor lamination stack 26 are filled with the granular first set 36. The fill height here is substantially a tenth of the extension direction of first pockets 28 in the direction of axis of rotation 4. In an insertion step 52, permanent magnets 32 of second set 38, created in creation step 48, are inserted in first pockets 28 and positioned according to the desired hybrid magnet 40. Thus, to create hybrid magnets 40 shown in FIGS. 2 and 3a, permanent magnet 32 of second set 38 is placed against the radially outermost boundary wall of first pockets 28, whereby a gap to lamination stack 26 remains in the tangential direction. To create hybrid magnet 40 shown in FIG. 3b, each permanent magnet 32 of second set 28 is inserted substantially in the center into the particular first pocket 28, so that permanent magnets 32 of second set 38 are not in direct mechanical contact with rotor lamination stack 26. Rather, each permanent magnet 32 of second set 38, which forms the particular core of hybrid magnets 40, is not in further contact with the exception of first set 36.

In a magnetic field application step 54, an external magnetic field, radial in the region of first pocket 28, is applied, which in this region is parallel to the magnetization direction M of the desired hybrid magnet 40. In this regard, the magnetic field in the region of permanent magnet 32 of second set 38 is parallel to its magnetization direction, which simplifies its holding in the desired position. In a further filling step 56, the remaining first set 36 is filled into first pockets 28, whereby first set 36 is oriented according to the desired magnetization direction M of hybrid magnets 40 because of the external magnetic field, on the one hand, and the magnetic field produced by permanent magnets 32 of second set 38, on the other. The particular pockets 28 are filled completely with first set 26, so that each permanent magnet 32 of second set 38 is completely covered by first set 36. In other words, each permanent magnet 32 of second set 38 is surrounded on both sides by the particular first set 36 in the direction of axis of rotation 4.

In a compression step 58, dimensionally stable permanent magnets 32 of first set 36 are created, whereby first set 36 is compressed in a direction parallel to axis of rotation 4 and thereby sintered. In so doing, first set 36 is heated in addition. However, the temperature remains below the recrystallization temperature of first set 36, on the one hand, so that the granular structure of first set 36 is retained, and, on the other, below the temperature that leads to a complete demagnetization of permanent magnet 32 of second set 38.

By means of such a procedure, permanent magnet 32 of the second set remains substantially dimensionally stable and first pockets 28 are not damaged. During the sintering 58, dimensionally stable permanent magnet 32 of first set 36 is connected to permanent magnets 32 of second set 38. The magnetization directions M of permanent magnet 32 of the first set and second set 36, 38 are parallel to one another, which is why hybrid magnet 40 also has a substantially uniform magnetization direction.

After connection of the two permanent magnets 32 to form hybrid magnet 40, the external magnetic field is removed in a turning-off step 60. If not first pocket 28 but a mold especially prepared for this case was used as the press mold, the formed hybrid magnet is removed from the press mold in a removal step 62 and trimmed to the desired length. The length of specific hybrid magnets 40 correspond here to provided first pocket 28 of lamination stack 26.

Figure 5:
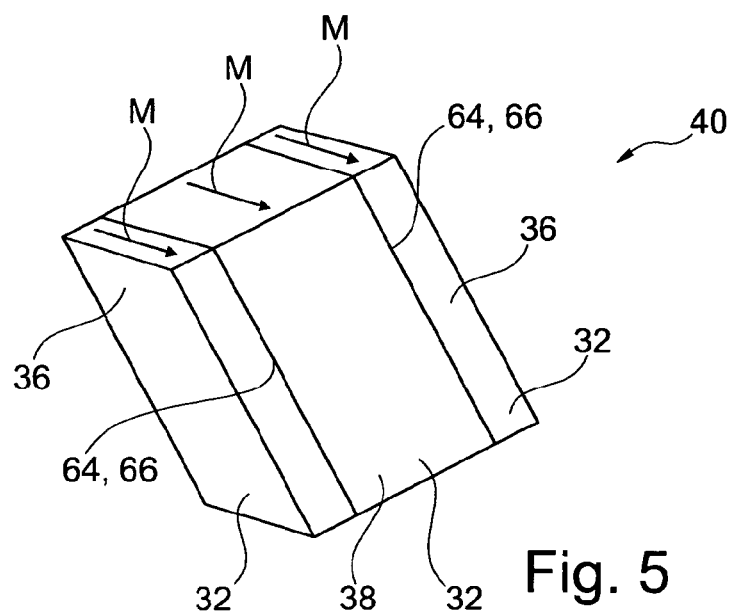
FIG. 5 shows an alternative of the hybrid magnet.

A further embodiment of hybrid magnet 40 is shown in FIG. 5. Hybrid magnet 40 has the cuboid permanent magnet 32 of second set 38, which is magnetized in a preferred direction M. The magnetization direction M is perpendicular to the course of permanent magnet 32 and parallel to boundary surfaces 64 of the cuboid form. A permanent magnet 32 of first set 36, which is also cuboid, lies flush against boundary surfaces 64. Consequently, hybrid magnet 40 is also formed as a cuboid. An adhesive layer 66, which is applied to boundary surfaces 64 of permanent magnet 32 of second set 38 and holds permanent magnets 32 together, is arranged between permanent magnets 32. The volume of each permanent magnet 32 of first set 36 constitutes substantially half of the volume of permanent magnet 32 of second set 38. It is also possible, however, to reduce the volume of permanent magnets 32 of first set 36 such that each permanent magnet 32 of first set 36 has substantially a tenth of the volume of permanent magnet 32 of first set 36. In this case, boundary surfaces 64 of permanent magnet 32 of second set 38 are covered over the entire surface by the particular permanent magnet 32 of first set 36.

Figure 6:
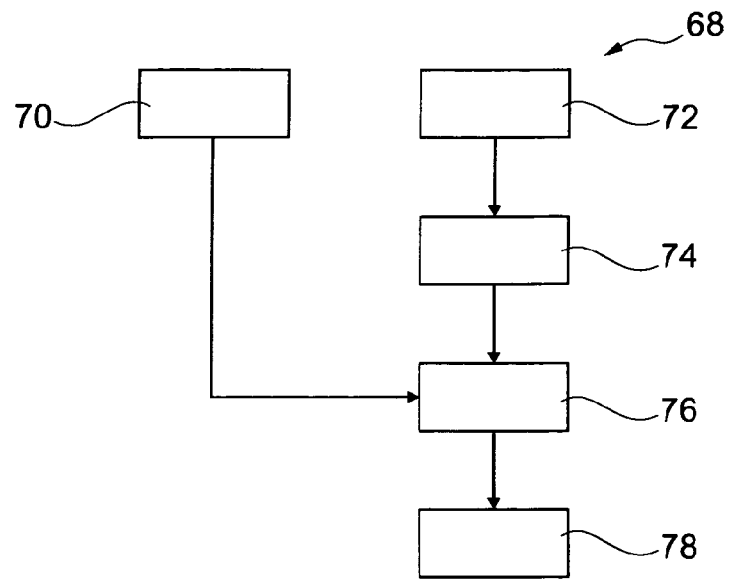
FIG. 6 shows schematically a method for producing the hybrid magnet according to FIG. 5.

A second method 68 is shown schematically in a flow-chart in FIG. 6, by means of which hybrid magnet 40 shown in FIG. 5 is produced. In two separate, substantially independent creation steps 70, 72, permanent magnet 32, forming the core of hybrid magnet 40, of second set 38 and a mother block are created, whereby the cross section of the mother block corresponds substantially to that of permanent magnets 32 of first set 36. The mother block, however, has double the length of permanent magnets 32 of first set 36 in the extension direction.

The block and the core are created by injection molding technology, whereby while both of these are being formed an external magnetic field is applied to the mold used for the creation process, in order to impress a desired magnetization M on the core and the mother block. In a halving step 74, the mother block formed in creation step 72 is cut in half, whereby two blocks are formed whose cross section corresponds to that of permanent magnets 32 of first set 36 of hybrid magnet 40, and their length is also the same. In other words, the two permanent magnets 32 of first set 36 are created from the mother block by means of trimming.

In a connection step 76, the two boundary surfaces 64 of permanent magnet 32 of second set 38 are provided with adhesive layer 66 and permanent magnets 32 of first set 36 are applied to the core-forming permanent magnet 32 of second set 38. After the application, permanent magnets 32 are pressed together, whereby forces directed toward one another are exerted on both permanent magnets 32 of first set 36. The composite created in this way is cut or sawed in a trimming step 78 to the length of desired hybrid magnet 40.

Figure 7A:
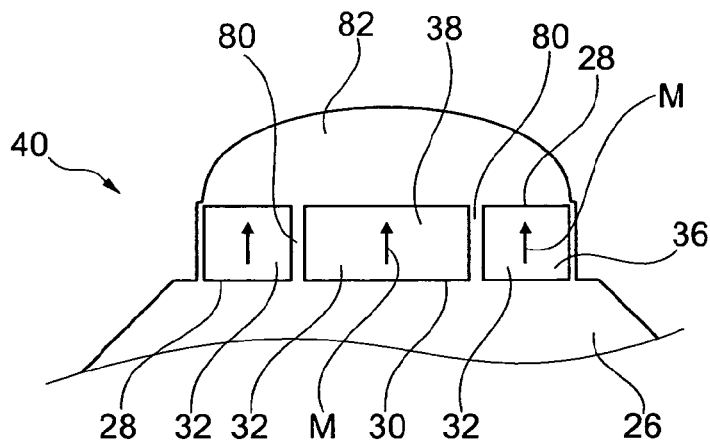
FIGS. 7a, b show further embodiments of the hybrid magnets.
Figure 7B:
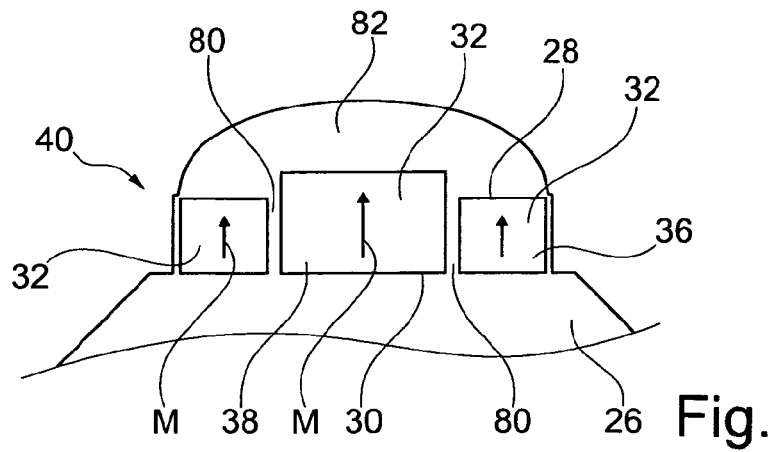

In FIGS. 7a and 7b, two further embodiments of assembled hybrid magnet 40, whose magnetization direction M is substantially radial, are shown in a detail in a sectional illustration perpendicular to axis of rotation 4. Permanent magnets 32 of first set 36, which are arranged in the tangential direction to permanent magnet 32 of second set 38, located in second pocket 30, are disposed form-fittingly in first pockets 28 of rotor lamination stack 26. Crosspieces 80 of rotor lamination stack 26, which run parallel to the magnetization direction M and form the walls of the particular pockets 28, 30, are located between adjacent permanent magnets 32. Consequently, permanent magnets 32 of the particular hybrid magnet 40 are not in direct mechanical contact.

By means of this type of arrangement of permanent magnet 32 of first set 36, permanent magnet 32 of second set 38, having the relatively low second magnetic coercive field strength $Hcj_2$, is protected relatively effectively against demagnetization by the magnetic field generated by electromagnet structure 12. To direct the magnetic field generated by hybrid magnet 40, the cross section of rotor 6 is not circular, as in the example shown in FIG. 1. The rotor in the region of hybrid magnets 40 has a convexity 82, which is radial to each hybrid magnet 40, comparable to rotor 6 shown in FIG. 2.

Hybrid magnet 40 shown in FIG. 7b differs from the magnet shown in FIG. 7a by the increased extension of permanent magnet 32 of second set 38 in the radial direction, therefore perpendicular to the arrangement direction of individual permanent magnets 32. Thereby, both second pocket 30 and permanent magnet 32 of second set 38 project into convexity 82.

The invention is not limited to the exemplary embodiments described above. Rather, other variants of the invention can also be derived herefrom by the person skilled in the art, without going beyond the subject matter of the invention. Furthermore, particularly all individual features described in relation to the exemplary embodiments can also be combined with one another in a different manner, without going beyond the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing a hybrid magnet of an electrical machine, the method comprising:
   forming a core from a second set;

placing the core in a press mold; and filling the press mold with a first set, whose magnetic coercive field strength at, at least, the operating temperature of the electrical machine is greater than a magnetic coercive field strength of the second set, wherein the first set is sintered in the press mold, wherein an external magnetic field is applied during the filling or sintering, and wherein the external magnetic field is oriented parallel to a magnetization direction of the core, such that the hybrid magnet has a linear magnetization in a single direction.

2. The method according to claim 1, wherein a pocket of a lamination stack of a rotor or stator of the electrical machine is selected as the press mold.

3. The method according to claim 1, wherein the press mold is filled partially with the first set before placing the core in the press mold.

* * * * *